US010237746B2

(12) United States Patent
Fischer et al.

(10) Patent No.: US 10,237,746 B2
(45) Date of Patent: Mar. 19, 2019

(54) COEXISTENCE MANAGEMENT VIA SCHEDULING

(71) Applicant: Avago Technologies General IP (Singapore) Pte. Ltd., Singapore (SG)

(72) Inventors: Matthew J. Fischer, Mountain View, CA (US); Baoguo Yang, Saratoga, CA (US); Nelson Sollenberger, St. Thomas, PA (US); Yong Li, San Diego, CA (US); Vinko Erceg, Cardiff, CA (US)

(73) Assignee: Avago Technologies International Sales Pte. Ltd., Singapore (SG)

( * ) Notice: Subject to any disclaimer, the term of this patent is extended or adjusted under 35 U.S.C. 154(b) by 80 days.

(21) Appl. No.: 14/969,202

(22) Filed: Dec. 15, 2015

(65) Prior Publication Data

US 2017/0142592 A1    May 18, 2017

Related U.S. Application Data

(60) Provisional application No. 62/255,397, filed on Nov. 14, 2015.

(51) Int. Cl.
*H04W 16/14* (2009.01)
*H04W 72/04* (2009.01)
(Continued)

(52) U.S. Cl.
CPC ....... *H04W 16/14* (2013.01); *H04W 72/0446* (2013.01); *H04W 72/1263* (2013.01);
(Continued)

(58) Field of Classification Search
CPC . H04W 16/14; H04W 74/04; H04W 74/0816; H04W 72/0446; H04W 72/1263; H04W 84/042; H04W 84/12
See application file for complete search history.

(56) References Cited

U.S. PATENT DOCUMENTS

2013/0329694 A1* 12/2013 Vrzic ................... H04W 36/165
                                                        370/331
2015/0237645 A1*  8/2015 Andrianov ........ H04W 72/1215
                                                        370/329

(Continued)

*Primary Examiner* — Joshua Kading
(74) *Attorney, Agent, or Firm* — Foley & Lardner LLP

(57) ABSTRACT

In some aspects, the disclosure is directed to methods and systems for coexistence management. A first access point is scheduled a time to begin transmission of a packet to a user device in an unlicensed frequency band using a first RAT. The time to begin the transmission is scheduled to avoid transmission overlap with a second access point using a second RAT in the unlicensed frequency band, and scheduled according to information from the second access point regarding operation in the unlicensed frequency band using the second RAT. One of the first and second RATs includes one of a WLAN RAT or a LTE based RAT, and another of the first and second RATs includes a remaining one of the WLAN RAT or the LTE based RAT, in one or more embodiments. The first access point receives updated information regarding operation in the unlicensed frequency band using the second RAT. Using the updated information, an updated time for the first access point to begin the transmission using the first RAT is determined, the updated time determined to avoid transmission overlap with the second RAT in the unlicensed frequency band. The first access point transmits, according to the determined updated time, the packet in the unlicensed frequency band using the first RAT.

20 Claims, 10 Drawing Sheets

(51) Int. Cl.
*H04W 74/04* (2009.01)
*H04W 72/12* (2009.01)
*H04W 84/12* (2009.01)
*H04W 84/04* (2009.01)
*H04W 74/08* (2009.01)

(52) U.S. Cl.
CPC ........ *H04W 74/04* (2013.01); *H04W 74/0816* (2013.01); *H04W 84/042* (2013.01); *H04W 84/12* (2013.01)

(56) References Cited

U.S. PATENT DOCUMENTS

2015/0381291 A1* 12/2015 Mahajan ................ H04B 15/00
 370/252
2016/0066306 A1* 3/2016 Khawer ............ H04W 72/0446
 370/329

* cited by examiner

COEXISTENCE MANAGEMENT VIA SCHEDULING

CROSS REFERENCE TO RELATED APPLICATIONS

This application claims priority to and the benefit of U.S. Provisional Application No. 62/255,397, filed Nov. 14, 2015, entitled "COEXISTENCE MANAGEMENT VIA SCHEDULING", assigned to the assignee of this application, and which is incorporated herein by reference in its entirety for all purposes.

FIELD OF THE DISCLOSURE

This disclosure generally relates to systems and methods for managing transmissions within a communications system, including but not limited to systems and methods for coexistence between radio access technologies (RATs).

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As increased data throughput and other developments occur, updates and new standards are constantly being developed for adoption, such those associated with the third generation partnership project (3GPP) and IEEE 802.11.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following standard(s) and specification(s), including any draft versions of such standard(s) and specification(s), are hereby incorporated herein by reference in their entirety and are made part of the present disclosure for all purposes: Long-Term Evolution (LTE); LTE-Advanced (LTE-A); LTE-Unlicensed (LTE-U); 3GPP; and IEEE 802.11. Although this disclosure can reference aspects of these standard(s) and specification(s), the disclosure is in no way limited to these aspects. Various embodiments of these standard(s) and specification(s), such as LTE-Unlicensed (LTE-U), and licensed-assisted access (LAA) LTE (sometimes referred to as LTE-LAA or LAA), are within the scope of the disclosure.

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for coexistence management.

A. Computing and Network Environment

Figure 1A:
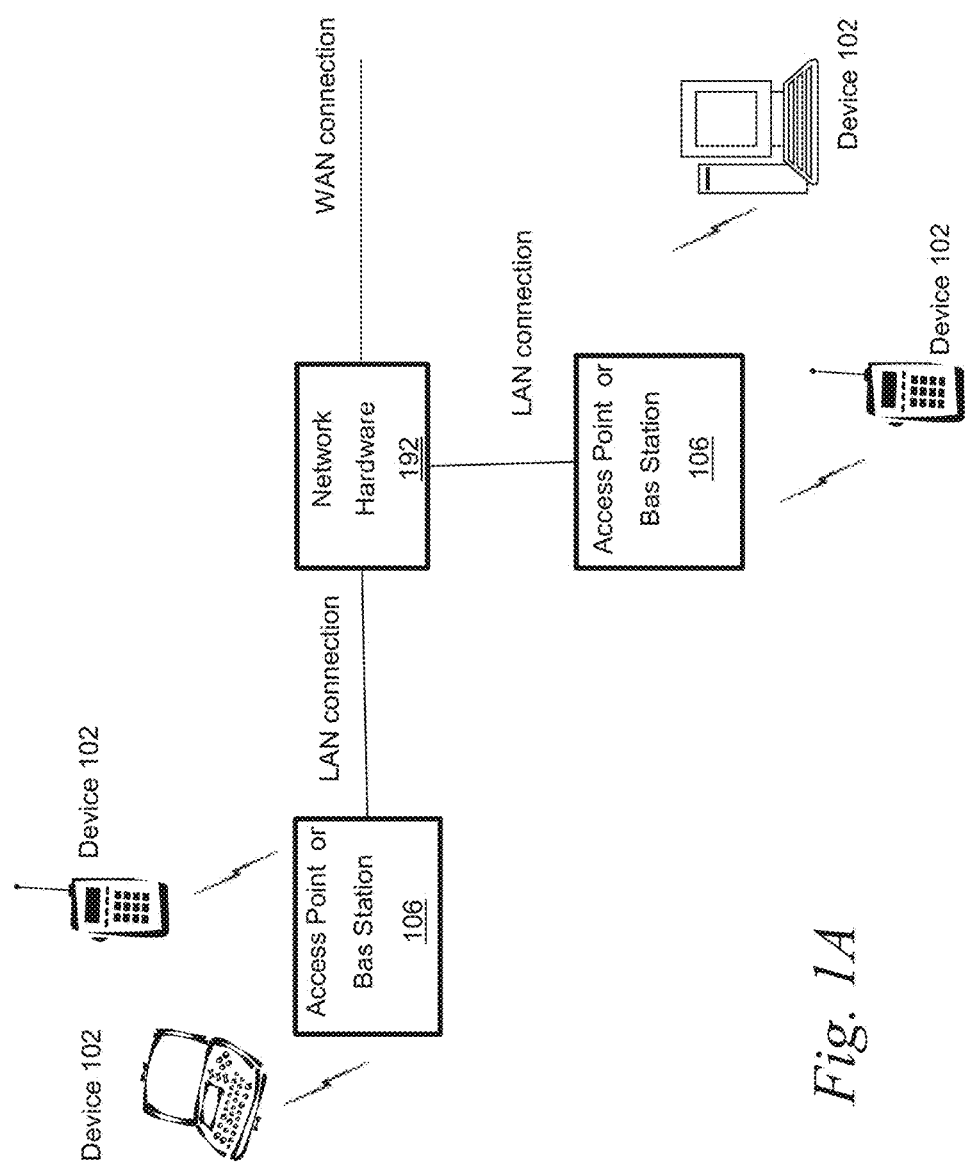
FIG. 1A is a block diagram depicting an embodiment of a network environment including one or more wireless communication devices in communication with one or more devices or stations.

Prior to discussing specific embodiments of the present solution, aspects of the operating environment as well as associated system components (e.g., hardware elements) are described in connection with the methods and systems described herein. Referring to FIG. 1A, an embodiment of a network environment is depicted. In brief overview, the network environment includes a wireless communication system that includes one or more base stations 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or base station are described in greater detail with reference to FIGS. 1B and 1C. The network environment can be an ad hoc network environment, an infrastructure wireless network environment, a subnet environment, etc., in one embodiment.

Terms such as "wireless communication device", "user equipment," "mobile station," "mobile," "mobile device," "subscriber station," "subscriber equipment," "access terminal," "terminal," "user device," "user terminal," "handset," and similar terminology, can refer to a wireless device utilized by a subscriber or user of a wireless communication service to receive or convey data, control, voice, video, sound, gaming, or substantially any data-stream or signaling-stream. The foregoing terms can be utilized interchangeably in the present disclosure. Likewise, terms such as "access point (AP)," "wireless access point (WAP)," "base station," "base transceiver station", "Node B," "evolved Node B (eNode B or eNB)," home Node B (HNB)," "home access point (HAP)," and similar terminology, can be utilized interchangeably in the present disclosure, and refer to a wireless network component or apparatus that serves and receives data, control, voice, video, sound, gaming, or substantially any data-stream or signaling-stream from a set of wireless devices.

Referring again to FIG. 1A, the base stations 106 can be operably coupled to the network hardware 192 via local area network connections. The network hardware 192, which can include a router, gateway, switch, bridge, modem, system controller, appliance, etc., can provide a local area network connection for the communication system. Each of the base stations 106 can have an associated antenna or an antenna array to communicate with the wireless communication devices 102 in its area. The wireless communication devices 102 can register with a particular access point 106 to receive services from the communication system (e.g., via a SU-MIMO or MU-MIMO configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments, a base station 106 includes a device or module (including a combination of hardware and software) that allows wireless communication devices 102 to connect to a wired network using LTE, Wi-Fi, and/or other standards. A base station 106 can be implemented, designed and/or built for operating in a wireless local area network (WLAN), or in a cellular network. A base station 106 can connect to a router (e.g., via a wired network) as a standalone device in some embodiments. In other embodiments, a base station can be a component of a router. A base station 106 can provide multiple devices 102 access to a network. A base station 106 can, for example, connect to a wired Ethernet connection and provide wireless connections using radio frequency links for other devices 102 to utilize that wired connection. A base station 106 can be built and/or implemented to support a standard for sending and receiving data using one or more radio frequencies. Those standards and the frequencies they use can be defined by the IEEE or 3GPP for example. A base station 106 can be implemented and/or used to support cellular coverage, public Internet hotspots, and/or on an internal network to extend the network's signal (e.g., Wi-Fi) range.

In some embodiments, the base stations 106 can be used for (e.g., in-home or in-building) wireless networks (e.g., IEEE 802.11, Bluetooth, ZigBee, cellular, any other type of radio frequency based network protocol and/or variations thereof). Each of the wireless communication devices 102 can include a built-in radio and/or is coupled to a radio. Such wireless communication devices 102 and/or base stations 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more base stations 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
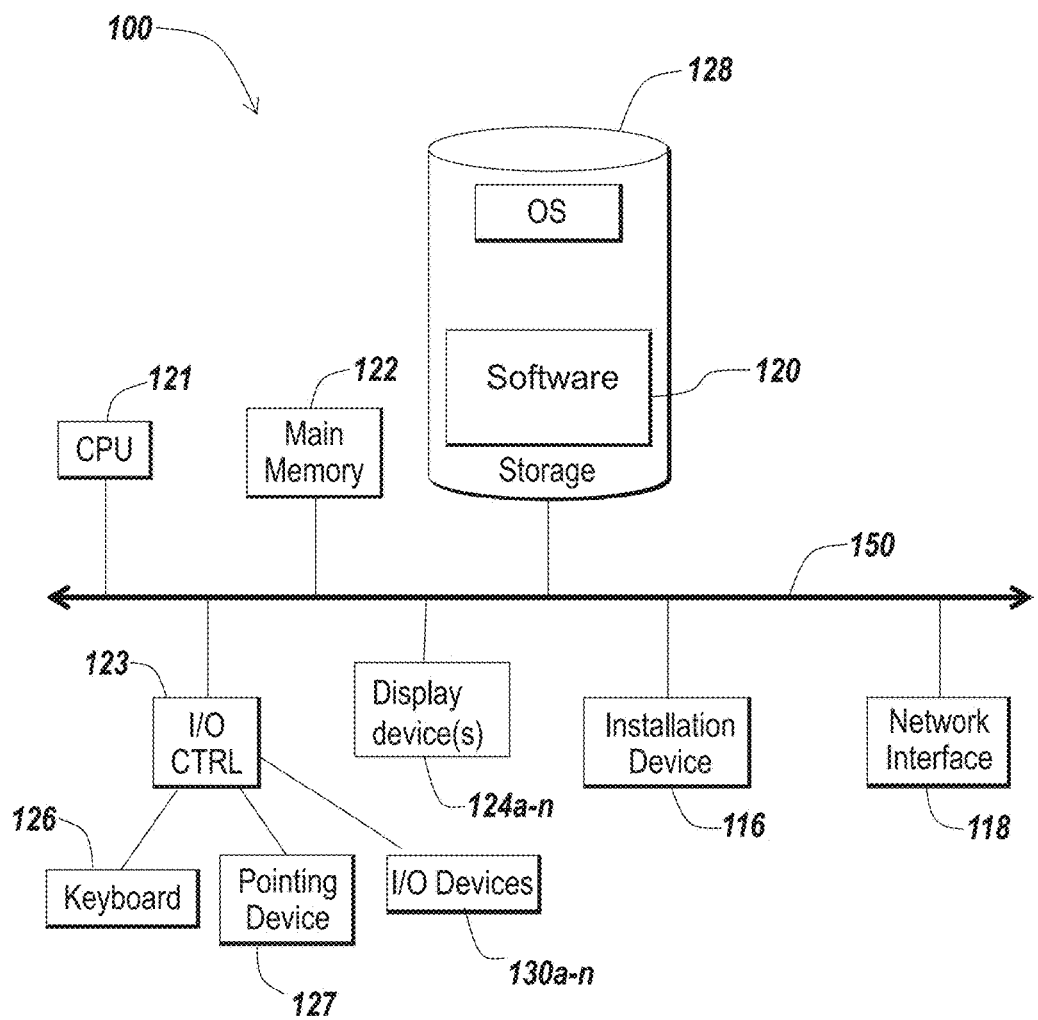
FIGS. 1B and 1C are block diagrams depicting embodiments of computing devices useful in connection with the methods and systems described herein.
Figure 1C:
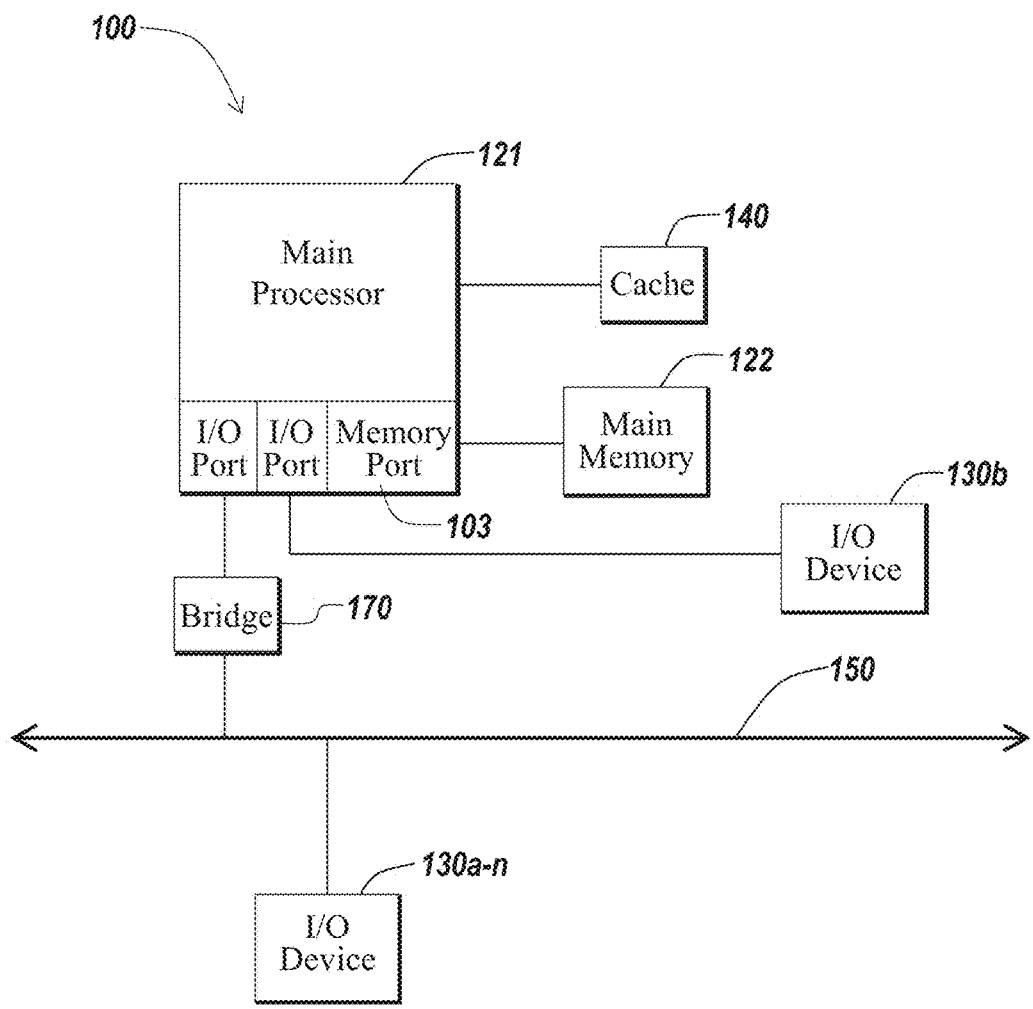

The communications device(s) 102 and base station(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England, or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130a-n via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINI-BAND communications technology. FIG. 1C also depicts an embodiment in which local busses and direct communication are mixed: the processor 121 communicates with I/O device 130a using a local interconnect bus while communicating with I/O device 131 directly.

A wide variety of I/O devices 130a-n and 131 can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices 130a-n can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax, LTE, LTE-A and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be implemented for using multiple displays 124a-124n. One ordinarily skilled in the art will recognize and appreciate the various ways and embodiments that a computing device 100 can be implemented to have one or more display devices 124a-124n.

In further embodiments, an I/O device 130a-n can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, sensor, desktop computer, laptop or notebook computer, server, handheld computer, mobile telephone, or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Coexistence Management

This disclosure describes methods and systems for coexistence management using cross-RAT information exchange. In one or more embodiments, coexistence management is implemented using existing (e.g., LTE-U, LAA or WiFi) or modified protocols and/or behaviors for instance, such as snooping information about a first RAT by a device of another RAT, or the use of a low or high latency interface between RATs to share information. In one or more embodiments, the shared or acquired information is used to determine whether a LTE-based or WiFi device, for instance, should attempt access to the unlicensed band in the presence of device(s) operating under a different RAT, and if so how aggressively to attempt access and coexist fairly. In one or more embodiments, a mechanism that is centralized or distributed or otherwise, provides scheduling functionality to dynamically schedule or coordinate transmissions relating to changes in the shared information. In one or more embodiments, this mechanism in the form of a joint self-organizing network (SON) that implements network adjustments to accommodate multi-RAT coexistence or a new RAT entrant. In one or more embodiments, the scheduling mechanism coordinates transmissions and/or reception across RATs to avoid overlap in time and frequency. For example, and in one or more embodiments, a device of a first RAT provides a transmit indication of a transmission start time, duration, etc., to reserve a channel from being occupied another RAT.

In one or more embodiments, coexistence management between RATs includes for example managing co-existence of LTE-U and WLAN operation across devices operating within an unlicensed or WLAN (sometimes referred to as WiFi or 802.11) frequency band or spectrum. WLAN frequency bands (e.g., in the 5 GHz band) are as yet unlicensed for use by LTE devices. Hence, coordination between LTE and WLAN operation would be beneficial if LTE devices are to operate in the same frequency bands. Unlicensed bands provide unlicensed access for short range radio transmissions, in one or more embodiments. Unlicensed bands include WLAN, WiFi or 802.11 frequency bands, in one or more embodiments. Unlicensed bands include Industrial, Scientific and Medical (ISM) bands, in one or more embodiments. LTE-U is sometimes referred to as LTE over unlicensed, or LTE in unlicensed spectrum. LAA is sometimes referred to as LAA LTE, or LAA using LTE. Any of these terms may be used interchangeably in this disclosure. In one or more embodiments, LAA refers to 3GPP efforts to standardize operation of LTE in the WLAN bands.

In one aspect, this disclosure is directed to a method for managing co-existence includes scheduling, for a first access point, a time to begin transmission of a packet to a user device in an unlicensed frequency band using a first radio access technology (RAT). The time to begin the transmission is scheduled to avoid transmission overlap with a second access point using a second RAT in the unlicensed frequency band, and scheduled according to information from the second access point regarding operation in the unlicensed frequency band using the second RAT, in one or more embodiments. One of the first and second RATs includes one of a WLAN RAT or a LTE based RAT, and another of the first and second RATs includes a remaining one of the WLAN RAT or the LTE based RAT, in one or more embodiments. In one or more embodiments, the first access point receives updated information regarding operation in the unlicensed frequency band using the second RAT. In one or more embodiments, using the updated information, an updated time for the first access point to begin the transmission using the first RAT is determined, the updated time determined to avoid transmission overlap with the second RAT in the unlicensed frequency band. In one or more embodiments, the first access point transmits, according to the determined updated time, the packet in the unlicensed frequency band using the first RAT.

In one or more embodiments, the updated time is determined in one of: a central scheduler for the first and second RATs, a distributed scheduler system including at least one device operating in the first RAT and at least one device operating in the second RAT, or a user terminal operating in at least one of the first RAT and the second RAT. In one or more embodiments, the updated time is determined using the information from the second access point, the updated information, and information regarding operation using the first RAT in the unlicensed frequency band. In one or more embodiments, the updated time is determined by negotiating between the first access point using the first RAT, and at least one device using the second RAT in the unlicensed frequency band. In one or more embodiments, the updated time is determined by allocating or re-allocating a channel for the transmission or a transmission using the second RAT, initiating a transmission back off by a device of the second RAT, or obtaining pre-approval for the transmission to begin at the updated time.

In one or more embodiments, the first access point receives the updated information by intercepting, by the first access point, a communication in second RAT, and at least one of extracting or decoding at least a portion of the updated information from the intercepted communication. In one or more embodiments, a SON is established between at least the first access point and one or more devices operating in the unlicensed frequency band using the second RAT, the SON implementing a network adjustment to accommodate the transmission by the first access point at the updated time. In one or more embodiments, the second access point determines, responsive to the transmission using the first RAT, to transition a device of the second RAT to a third RAT or another frequency band for transmitting a packet. In one or more embodiments, the first access point sends to a device of the second RAT responsive to the determined updated time, one or more transmit indications each including at least one of a corresponding transmission start time, transmission duration, or transmission channel number. In one or more embodiments, determining the updated time further includes coordinating transmissions in the unlicensed frequency band between at least the first access point using the first RAT and at least one device using the second RAT.

In another aspect, this disclosure is directed to a system for managing co-existence. In one or more embodiments, the system includes a first access point operating in an unlicensed frequency band using a first RAT. In one or more embodiments, a scheduling engine determines, for the first access point, a time to begin transmission of a packet to a user device in the unlicensed frequency band using the first RAT. In one or more embodiments, the time to begin the transmission is determined to avoid transmission overlap with a second access point using a second RAT in the unlicensed frequency band, and scheduled according to information from the second access point regarding operation in the unlicensed frequency band using the second RAT. In one or more embodiments, one of the first and second RATs includes one of a WLAN RAT or a LTE based RAT, and another of the first and second RATs includes a remaining one of the WLAN RAT or the LTE based RAT. In one or more embodiments, the first access point receives updated information regarding operation in the unlicensed frequency band using the second RAT. In one or more embodiments, the scheduling engine determines, using the updated information, an updated time for the first access point to begin the transmission using the first RAT, the updated time determined to avoid transmission overlap with the second RAT in the unlicensed frequency band. In one or more embodiments, the first access point transmits, according to the determined updated time, the packet in the unlicensed frequency band using the first RAT.

In one or more embodiments, the scheduling engine includes one of a central scheduler for the first and second RATs, a distributed scheduler system including at least one device operating in the first RAT and at least one device operating in the second RAT, or a user terminal operating in at least one of the first RAT and the second RAT. In one or more embodiments, the scheduling engine determines the updated time using the information from the second access point, the updated information, and information regarding operation using the first RAT in the unlicensed frequency band. In one or more embodiments, the scheduling engine at least one of allocates or re-allocates a channel for the transmission or a transmission using the second RAT, initiates a transmission back off by a device of the second RAT, or obtains pre-approval for the transmission to begin at the updated time. In one or more embodiments, the first access point intercepts a communication in second RAT, and at least one of extracts or decodes at least a portion of the updated information from the intercepted communication.

In one or more embodiments, the scheduling engine determines, responsive to the transmission using the first RAT, to transition a device of the second RAT to a third RAT or another frequency band for transmitting a packet. In one or more embodiments, the first access point sends to a device of the second RAT responsive to the determined updated time, one or more transmit indications each including at least one of a corresponding transmission start time, transmission duration, or transmission channel number. In one or more embodiments, the scheduling engine coordinates transmissions in the unlicensed frequency band between at least the first access point using the first RAT and at least one device using the second RAT.

In another aspect, this disclosure is directed to a method for managing co-existence. In one or more embodiments, a time to begin transmission of a packet in an unlicensed frequency band using a first RAT is determined for a first access point. In one or more embodiments, the time to begin the transmission is scheduled to avoid transmission overlap with a device using a second RAT in the unlicensed frequency band, and scheduled according to received information regarding operation in the unlicensed frequency band using the second RAT. In one or more embodiments, the first RAT includes a wireless local area network RAT or a long term evolution based RAT. In one or more embodiments, the first access point receives updated information regarding operation in the unlicensed frequency band using the second RAT. In one or more embodiments, using the updated information, an updated time for the first access point to begin the transmission using the first RAT is determined, the updated time determined to avoid transmission overlap with the second RAT in the unlicensed frequency band. In one or more embodiments, the first access point transmits, at the updated time, the packet in the unlicensed frequency band using the first RAT. In one or more embodiments, receiving the updated information includes intercepting, by the first access point, a communication in second RAT, and at least one of extracting or decoding at least a portion of the updated information from the intercepted communication.

In one or more embodiments, the disclosure is directed to a method for multi-RAT or multi-protocol coexistence. In one or more embodiments, a device operating within a frequency band of a wireless local area network, but operating in a first RAT such as a non-WLAN (e.g., LAA) protocol, determines that the frequency band is quiet at a first time instance (e.g., listen before talk—LBT) before accessing the frequency band. In one or more embodiments, a device operating in a first RAT (e.g., a WLAN device) is implemented to defer to signals (e.g., of another RAT) above a predefined energy detection (ED) threshold. A co-existence mechanism based on ED is sometimes not reliable, for example where there is significant energy level fluctuation.

In the absence of suitable mechanisms for cross-RAT (such as LTE-U and WLAN) coexistence, one or both of the RATs' system throughputs can suffer due to collisions, in one or more embodiments. In one or more embodiments, some or most collisions cannot be countered by MCS adjustment. For instance, if no ED deferral to WLAN is implemented in a LTE-U device, WLAN system could suffer substantially in system throughput. For instance, fairness in spectrum usage is questionable where WLAN or WiFi bands are being invaded and surrendered to LAA/LTE-U control and decision-making. Invasive access occurs after a simplistic channel access approach is applied, e.g., carrier sense. Therefore, a LAA/LTE-U device can intrude on or enter WiFi bands when the device detects a clear channel and continue communications while not offering a WiFi device a chance to interrupt, in one or more embodiments.

In one or more embodiments, a scheduling mechanism uses cross-RAT information sharing or exchange to determine when a device of a first RAT (e.g., LTE-U/LAA device) might attempt access to an unlicensed frequency band that is in use by one or more devices of a second RAT (e.g., WiFi), or vice versa. In one or more embodiments, the scheduling mechanism responds to a change in the cross-RAT information to schedule or re-schedule a transmission that avoids overlapping with transmissions of the other RAT in time or frequency, thereby enabling coexistence between RATs that presently do not communicate or coordinate between themselves to achieve a reasonable level of fairness in sharing the unlicensed frequency band. Although this disclosure sometimes describes a LTE based (e.g., LTE-U or LAA) device operating in relation to a WLAN/WiFi device, this is merely by way of illustration and not intended to be limiting in any way. It is should be understood that any device of a first RAT can operate in relation to a device of a different or even the same RAT, in like manner. In one aspect, the present disclosure provides a dual RAT solution where one is an intruder into another RAT's frequency band, which does not have to be an unlicensed band. For example, the dual RAT solution could apply to coexistence management between BT and WLAN.

In one or more embodiments, LAA setup and/or coexistence within WiFi bands is managed via cross sharing of underlying operating information (e.g., WiFi to LAA, and LAA to WiFi). In one or more embodiments, the shared information provides (a) a LAA/LTE-U device or facilitator with WiFi operating data for use in determining whether a LAA device should attempt access and if so how aggressively to attempt access and/or coexist; and/or provides (b) a WiFi device or facilitator with data (e.g., using an enhancement to current protocols) about LAA/LTE-U operation that could assist the WiFi device or facilitator in carrying out its own coexistence behavior(s). In some embodiments, this sharing or exchange of data occurs when LAA/LTE-U eNBs and WiFi APs are co-located within a determined or specified region.

In one or more embodiments, one or more types of information are received, accessed, exchanged or shared (in one or both directions relative to each pair of RATs). The types of information include, for example:

Information about UEs being serviced by a particular RAT and/or an access point of the RAT, such as the number of UEs serviced, the geographical distribution of the UEs, number of transmit spatial streams, and data load with each UE;

Information about channel loading by a particular RAT and/or an access point of the RAT, such as bandwidth utilization, subband occupancy or utilization, loading due to directional and/or omnidirectional mode transmissions, dropped packets, level of queuing/buffering, etc., at a particular instance or over time;

Information about data types (e.g., carried by a particular RAT and/or an access point of the RAT), such as video data, audio data, multimedia data, control signals, data associated with real time or near real time delivery, data of various levels of priority, urgency or importance, data associated with transmissions of specific length(s), data characterized by certain transmission gaps, data characterized by certain transmission pattern(s), data associated with certain application classification(s), etc.;

Information about quality of service (QoS) pertaining to a RAT and/or access point, such as target or guaranteed level(s) and/or threshold(s) for transmission rates and/or error rates, use of best effort protocols, link quality, channel state information (CSI), channel aging, Doppler changes, received signal strength information (RSSI), etc.;

Information on operators, such as operator identifier(s) corresponding to a RAT and/or a corresponding access point, such as identifier(s) of wireless or broadband service provider(s) or carrier(s), etc.;

Information on timing data according to operation in a RAT and/or of an access point, such as clocking information, scheduling information, channel reservation periods, inter-transmission gap, periodicity of transmission/sounding frames, time of flight of a transmission, etc.;

Information on UE reception experience data or metrics, e.g., signal-to-interference-plus-noise ratio (SINR), signal-to-noise ratio (SNR), channel estimation information, failed access attempt data, urgency data, dropped packets information, path loss, CSI, transmission latency, etc.;

Information on IP addresses and/or other address identifiers from a RAT, such as an address for identifying a particular user terminal, or quantifying channel usage, etc.;

Information on channels and channel numbers (e.g., for WLAN), such as the number of channels, channel identifiers, and/or frequency band or range of each channel;

Scheduler information for a RAT and/or a corresponding access point, such as time and/or length of one or more transmissions, inter-transmission gap(s), priority level of a scheduled transmission, frequency/time division multiplexing configuration information, and/or clock information;

Information on power levels of one or more transmissions of a RAT and/or corresponding transmitter(s), and/or ED detection levels and/or thresholds, transmission power capability of a corresponding transmitter;

Information on neighboring nodes for one or more RATs, e.g., of one or more nodes of a same or different RAT, relative to a first RAT, such as node count, geographical distribution, inter-node communications and/or co-existence configurations;

Information on UE data and/or parameters corresponding to a RAT and/or a corresponding access point, such as modulation and coding scheme (MCS), transmission power, data rate, SINR, SNR, etc., Information on channel busy parameters of a RAT and/or a corresponding access point, such as channel reservation signals or parameters, beacon or notification information, Information on delay times of a RAT and/or a corresponding access point, such as transmission and/or response latency;

Buffer and/or queue information of a RAT and/or a corresponding access point, such as capacity of a buffer or queue, and/or levels of pending data or transmissions in the buffer or queue;

Information on path loss experienced by a RAT and/or a corresponding access point, such as attenuation of signal, fluctuations or patterns in signal power levels, information from channel estimation or CSI; and/or Status, capability and/or usage related data of a RAT and/or a corresponding access point, such as data transmission rate, operation mode (e.g., active, inactive, sleep, power-saving modes), power transmission levels, bandwidth utilization, number of spatial transmit streams supported, information included in a very high throughput (VHT) capabilities information field of a frame, dimensionality of an access point, single-user and/or multi-use multiple-input multiple output (MIMO) capabilities and/or configuration, etc.

In one or more embodiments, one or more RAT-specific or inter-RAT mechanisms or pathways for receiving, intercepting, extracting, accessing, passing, exchanging, communicating or otherwise sharing such information is available. For example and in one or more embodiments, the information can be accessed or received via an operator/in-home/enterprise backhaul connection (e.g., between RATs). In one or more embodiments, a backhaul connects two radio access networks (RANs), allowing information from one RAT to be appropriately translated and/or communicated for consumption by another RAT or by a cross-RAT coordination or management system. In one or more embodiments, the backhaul includes one or more intermediary devices that receives the information in a protocol or format specific to a source RAN, or independent or different from a native protocol or format of the source RAN. For instance, a source RAN may include an access point or entity that converts the information to a non-native format before communicating the converted information to the backhaul, destined for a destination RAN or a cross-RAT coordination or management system.

In one or more embodiments, the information is accessed or received via a wireless link (e.g., single or multi-hop) between access points of each RAT (e.g., from an LTE based eNB to a WiFi base station). For example, the information can be accessed or received via any short, intermediate or long range radio or wireless transmission, in one or more embodiments. The wireless transmission can use existing protocols from either of the two RATs, or use a common communication protocol supported by devices of both RATs, in one or more embodiments. A wireless linkage between access points of each RAT includes one or more hops (e.g., through one or more repeaters, relays, access points, or user devices) to convey the information. In one or more embodiments, multiple wireless hops could include the use of multiple communications protocols, e.g., Bluetooth, WLAN, etc.

In one or more embodiments, the information is accessed or received via UE or user device relaying (e.g., one or more relaying or repeater nodes) and/or relaying via any other types of intermediaries such as access points (e.g., eNBs, base stations) in one or more RATs. For example, information from an access point operating in a first RAT is transmitted or relayed via one or more relay devices operating in at least a first RAT, in one or more embodiments. The information is further transmitted or relayed via one or more relay devices operating in at least a second RAT, in one or more embodiments. Each device-to-device relay segment is wired or wireless. For instance, some segments are wired and others wireless, in one or more embodiments.

In one or more embodiments, the information is accessed or received via internal circuitry or bus structures. For example, where LAA/LTE-U/LTE eNB and WiFi are within a single device or box, the information sharing takes place within the device or box, between two RAT subsystems). In one or more embodiments, the internal circuitry or bus structures stores or buffers the information from one RAT subsystem at a memory location, for access by another RAT subsystem. In one or more embodiments, the information is accessed or received via a central information repository or collection and/or dissemination point. For example, a central external database or server obtains or receives the information about a first RAT, and redirects the information to a device of a second rate, in one or more embodiments. In one or more embodiments, the central external database or server stores the information for retrieval by an interested device of a second RAT.

In one or more embodiments, some types of information are exchanged or shared using or leveraging on conventional methods, such as carrier sense or ED. In one or more embodiments, one or more of such conventional methods are available under existing standards or communication protocols, such as those based on IEEE 802.11 or 3GPP. In one or more embodiments, some types of information are exchanged or shared, alternatively or additionally, using active, modified and/or custom protocols, such as modified WiFi and/or LTE based protocols, features and/or behaviors.

In one or more embodiments, one or more types of the information are exchanged or shared through one single path/method, or through any combination of available paths/methods described herein. In one or more embodiments, one or more factors or conditions such as latency, bandwidth and/or other link characteristics described herein play a part in routing decisions (e.g., if more than one route/methods exists), and/or in selecting coexistence behavior options. In one or more embodiments, the present system makes intrusion and/or coexistence decisions (dynamically or otherwise), using such exchanged or gathered information, along with local data and/or information. In one or more embodiments, the local data and/or information includes information native or pertaining to the RAT that is considering the information gathered from another RAT. In one or more embodiments, local and/or gathered information are used to determine an appropriate entrance into a shared band, or a fair coexistence between RATs.

A fair or balanced coexistence, in one or more embodiments, refers to an allocation or usage of the shared band between two or more RATs determined to allow operation that meets respective QoS, band utilization threshold and/or other metric(s) of the RATs. In one or more embodiments, a fair or balanced coexistence between RATs refers to operation according to a predetermined partition or allocation of bandwidth utilization to one or both RATs. In one or more embodiments, an imbalance (or unfair balance) of usage between RATs refers to a first RAT (e.g., an access point of the first RAT) using a share of the unlicensed band that is below a predetermined threshold.

In one or more embodiments, with the exchange of information, coordinated coexistence is carried out using a shared LAA/LTE-U and WiFi scheduler mechanism, system or architecture. In one or more embodiments, the scheduler receives the information identified above, to carry out a dynamic scheduling process. In one or more embodiments, mechanisms or architectural approaches for the scheduler include (i) backhaul linkages to one or more central schedulers associated with entire LTE based (e.g., eNB), WiFi (e.g., access point) networks; (ii) multi-RAT single box or device with an internal scheduler; (iii) dynamic master-slave or token-like configurations; (iv) shared scheduling duties (e.g., some duties or functions performed by WiFi side and some by LTE based side); (v) UE-side scheduler functionality; (vi) a central primary portion, a LTE based eNB portion and/or a WiFi AP scheduler portion with duty carve-ups; and (vii) any other combinations of the above both in fixed/static and dynamic configurations.

Figures 2A, 2B:
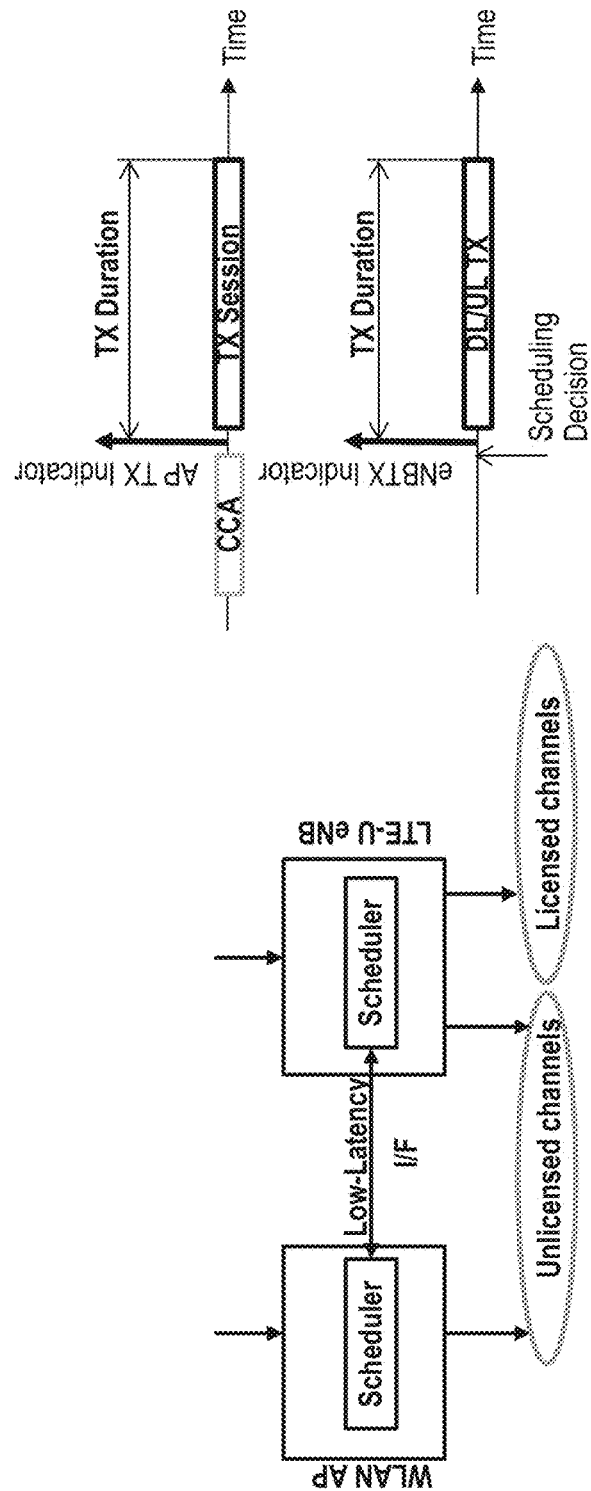
FIG. 2A depicts an embodiment of a system for co-existence management.
FIG. 2B depicts one embodiment of a method for co-existence management.

In one or more embodiments, scheduling functionality or duties are managed within a single node or distributed across any combination of nodes (base stations, central systems, UEs, etc.) to work independently or in concert regarding particular scheduling functions. For instance, FIG. 2A depicts one embodiment of a system for co-existence management, involving at least two scheduler portions. The extent, level or amount of scheduling (e.g., more or less scheduling functionality being introduced) could be dynamic and range from highly involved, detailed and low latency scheduling, to minor and high latency supportive scheduling functionality. In one or more embodiments, such supportive scheduling functionality includes, for instance, setup (e.g., RAT system initialization or configuration) and/or (channel) release related functionality. The scheduling or rescheduling, or extent thereof, is dynamic in one or more embodiments, relating to changes in information exchanged. In one or more embodiments, the scheduling or rescheduling, or extent thereof, is fixed for a particular session and/or current local environment. In one or more embodiments, the scheduling or rescheduling, or extent thereof, adapts on the fly per stream, transmission or session, for example according to or responsive to a (de)attach event, packet performance or transmission rate, channel condition, data type change, etc.

In one or more embodiments, the scheduling or rescheduling, or extent thereof, considers multi-operator scheduling concerns. For instance, in one or more embodiments, the scheduler attempts to allocate band usage (e.g., balance fair usage) between two or more operators (e.g., AT&T, Verizon, T-Mobile, Sprint) providing service within a common RAT. In one or more embodiments, the scheduler attempts to allocate band usage between two or more operators based on operating conditions/parameters that are different between the two or more operators, e.g., according to information received from the RANs of the two or more operators.

In one or more embodiments, the scheduler (e.g., associated with a first RAT) operates according to received/gathered information from a second RAT, along with counterpart local info from the first RAT. In one or more embodiments, the scheduler operates additionally through negotiation (e.g., with one or more RATs and/or corresponding access points), to configure or implement a scheduling functionality set (such as a scheduling or operating mode or configuration), and/or to identify an available one or more nodes on which such set could be carried out. Thereafter, the scheduler dynamically adapts in a similar manner as changes occur, for instance in the information being received/gathered, in one or more embodiments. In one or more embodiments, the scheduler attempts to avoid transmission overlap(s) across RANs in time and frequency, and in some embodiments include associated power considerations in the scheduling attempts. In one or more embodiments, the schedule performs scheduling operations, which includes for example channel (re)allocation, transmission back off or exit, getting preapproval (e.g., for a LAA/LTE-U device) to gain access to the desired unlicensed band. In one or more embodiments, the scheduler obtains preapproval from a first RAT (or corresponding device) that is presently (and/or has been) using or occupying the desired band, for a second RAT to use, enter or operate in the desired band.

In one or more embodiments, a device of a first RAT (e.g., a LAA/LTE-U device) gathers at least some of the information directly from a second RAT (e.g., a WiFi RAT, RAN or device(s)) via snooping or monitoring of transmissions in the second RAT. For instance, the device of the first device includes a sniffer or scanner function or subsystem to detect and/or monitor for such transmissions, and/or to access or extract the information from such transmissions. In one or more embodiments, the snooping or monitoring is performed without the second RAT being aware. In one or more embodiments, this operation is in addition to, or in lieu of using a carrier sense approach for gaining access to a channel for instance. In one or more embodiments, the snooping is performed by a device of a specific RAT, a cross-RAT device, and/or a coordinating device (with snooping functionality, e.g., a scheduler) for multi-RAT co-existence management.

In one or more embodiments, this snooping or monitoring functionality is enabled using novel hardware and/or protocol definition not found in current standards or proposals. For instance, and in one or more embodiments, the device of the first RAT includes, incorporates or accesses a subsystem that has limited or full capabilities in accessing or using the second RAT. For example, and in one or more embodiments, the present solution includes enhancing existing WiFi protocol and/or using specific hardware that support a WiFi node's snooping of LAA/LTE-U/LTE transmissions.

In one or more embodiments, the communications protocol of one RAT is modified or enhanced to include specific information to be shared for co-existence and/or intrusion management. For instance, and in one or more embodiments, WiFi protocols are modified by defining further fields and/or packet transmissions which deliver information that might be shared with or received by another RAT. For example, additional fields are added to one or more packets/frames if current fields prove insufficient to communicate such information.

Figure 2C:
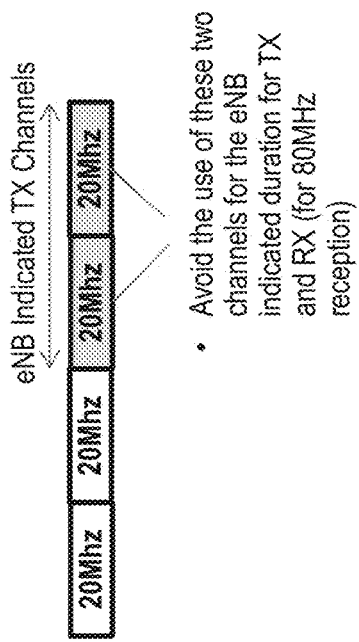
FIG. 2C depicts an embodiment of co-existence by avoiding overlaps across channels.
Figure 2D:
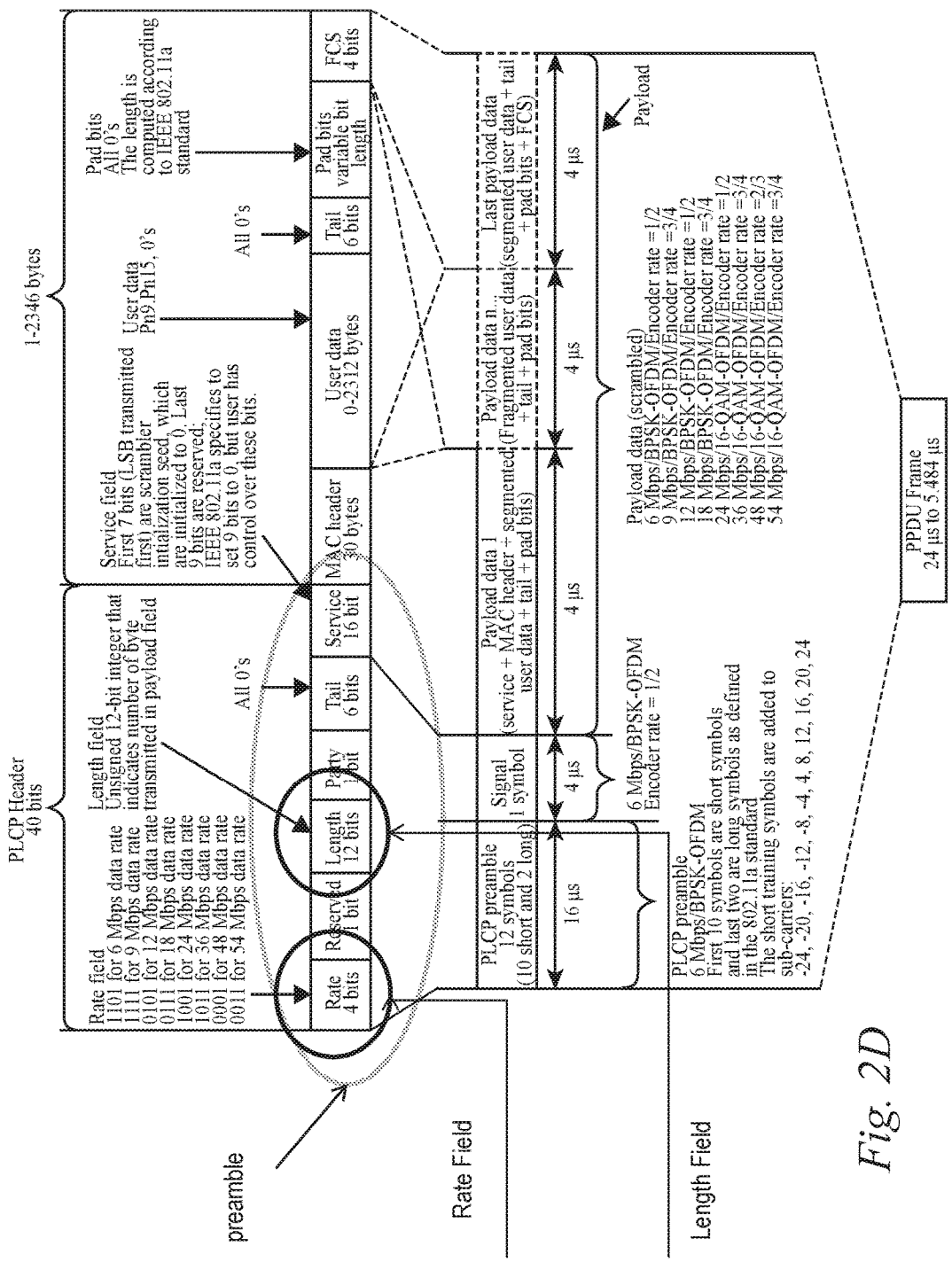
FIG. 2D depicts an embodiment of a packet from which to extract information.

In one or more embodiments, the snooping process includes extracting information from packets (e.g., WiFi packets) or portions thereof. For example, FIG. 2D depicts one embodiment of a packet from which to extract information. For instance, and in one or more embodiments, the preamble port of a packet is identified, parsed and/or decoded, to locate particular fields (e.g., rate, length fields) from which information is extracted. Different packets (e.g., beacons, control packets, payload/data packets) and portions thereof (e.g., headers) have different decode requirements, in one or more embodiments. Therefore in one or more embodiments, snooping capabilities could target one or more of the more easily decodable portions of a packet, field or frame. In one or more embodiments, snooping capabilities could include or extend to a more difficult portion of a packet, field or frame. For instance, in one or more embodiments, a snooping device enters a mode of operation (e.g., responsive to an inability or a requirement to obtain desired or enough information) wherein the snooping device decode an encrypted portion of a packet. For example, and in one or more embodiments, when considering an initial WiFi channel grab, a simple snoop might be sufficient, but a more difficult decode might be applied to gather data that could be used for friendlier coexistence.

In one or more embodiments, the snooping device or process uses cross-RAT clocking to facilitate decode of a transmission to obtain information, and/or synchronization of activity (e.g., for co-existence). In one or more embodiments, and by way of illustration, a snooping device (e.g., of a first RAT) performs snooping to access information for coexistence purposes, and uses backhaul or other pathways to access or exchange information for other purposes. For example, and in one or more embodiments, a snooping LAA/LTE-U device initially performs snooping to decide whether or not to pursue a LAA/LTE-U transmission, and responsive to a decision to do so, attempts to gather other information types via a backhaul pathway. Thereafter, the snooping device performs beacon or other packet snooping to acquire information, such as information that has no low latency type requirement associated therewith (e.g., for co-existence management), in one or more embodiments.

In one or more embodiments, snooped information is used for local (e.g., intra-RAT) access and/or cross-RAT coexistence decisions, or passed along to a single RAT or multi-RAT scheduler architecture, embodiments of which are described herein. The received information is, in one or more embodiments, used for single RAT (WiFi or LTE-U/LAA) and/or multi-RAT SON. In one or more embodiments, the snooping could be performed by one or more node types operating in one or more RATs. Examples of possible node types involved in snooping include WiFi APs, LTE/LTE-U/LAA eNBs, UEs or user devices, other RAT-specific entities and/or non-RAT-specific entities.

By way of an illustrative embodiment, a snooping device performs measurement or determination of channel conditions via preamble detection. In one or more embodiments, a snooping device operates or integrates with conventional WiFi/LTE based RAT and/or communication protocol, without needing further modifications to the WiFi/LTE based standard in some implementations. In one or more embodiments, a snooping device (e.g., a LAA/LTE-U sniffer) leverages on frame preambles and/or control messages (e.g., in WiFi) to support information exchange. This provides support for minimizing or managing device power, and/or measurement of channel condition for instance, in one or more embodiments. In one or more embodiments, snooped information is used to predict or determine ongoing activity, a time when a channel is not going to be available, and/or initiate or control over-the-air signaling to maximize sleep times, for example. By way of example, an eNB could support WiFi preamble detection for robust coexistence with WiFi, in one or more embodiments. In one or more embodiments, an eNB employs a preamble detection function to indirectly measure an overall channel condition (e.g., WiFi traffic loading, co-channel interference (CCI) or asynchronous co-channel interference (ACCI), and/or noise, etc.) as an illustration. This measurement allows the eNB to perform "optimal" initial channel selection and/or in-service (e.g., intra-RAT) channel changes.

For example, and referring again to FIG. 2D, an embodiment of preamble detection is depicted. By way of illustration, the rate field in an preamble of a WiFi frame is read and/or decoded for MCS information. In one or more embodiments, an WiFi node sets an MCS by WiFi link adaptation, based on a WiFi node's own measurement of channel condition. In one or more embodiments, the WiFi node includes MCS values in preambles of WiFi frames. An average of one or more of these MCS values (in detected preambles) is determined in one or more embodiments. In one or more embodiments, an eNB for instance, uses the average MCS value to determine an overall channel condition. By way of another example, the length field in an preamble of a WiFi frame is read and/or decoded. An eNB for instance, determines or computes an aggregate length over a given time period to derive a WiFi traffic loading of a channel, in one or more embodiments. In one or more embodiments, the eNB uses configurable threshold values of the average MCS to determine initial channel selection and/or dynamic channel change.

In one or more embodiments, staged snooping from RSSI through a full decode approach is performed. For example, via FFT spectrum monitoring, cyclic prefix, additional radar dynamic frequency selection (DFS), beacon decode, etc., could be performed. This depends on WiFi information and/or local counterpart (e.g., LAA/LTE-U) information for instance, in one or more embodiments. This staging is dynamic in one or more embodiments, based on types and/or content of snooped information, current coexistence configuration or mode, and/or stage of operation.

In one or more embodiments, a SON involves a single RAT, such as a WiFi SON. In one or more embodiments, local channel setup, selection and/or configuration takes place in association with a single base station of a single RAN. In one or more embodiments, advanced approaches involve coordination of multiple base stations within the RAN.

In one or more embodiments, information shared or gathered as described above is used to support joint self-organizing network or SON configuration. In one or more embodiments, one embodiment of a scheduler described above supports the joint SON configuration. Neighboring node information (e.g., of both WiFi and LAA/LTE-U) is used to make multi-RAT network adjustments to accommodate an LAA/LTE-U entry or exit for instance, in one or more embodiments. Such information is used to make multi-RAT network adjustments for multi-RAN and/or multi-network node coexistence, in one or more embodiments. In one or more embodiments, by considering information associated with one or more neighboring LTE based eNBs and one or more neighboring WiFi APs, coexistence decisions and/or operational behaviors are carried out to create a more "fair" and efficient unlicensed band utilization. In one or more embodiments, network adjustments could involve any modifications to current WiFi operations across multiple neighboring APs to accommodate a new LTE based eNB entrant for instance.

One or more nodes (of the joint SON) could accommodate current and dynamic changes associated with WiFi and/or LTE based traffic flow as identified from any of the received or shared information. In one or more embodiments, neighboring WiFi AP(s) and co-located neighboring or solo LAA/LTE-U eNB(s) exchange information that assists in setup and dynamic access, channel usage, other coexisting techniques or usages, and/or full or partial releases/handovers, for instance. By way of illustration, one environment could include an LAA eNB that overlaps two WiFi APs that cannot communicate with or hear each other, but are operating on different channels that limit a channel grab by the LAA eNB, in one or more embodiments. To accommodate the LAA eNB, the two WiFi APs are able to be moved to a same or adjacent channels to yield bandwidth to the LAA eNB, in one or more embodiments. In one or more embodiments, accommodation is made by way of coordinating simultaneous uplink (or downlink) periods involving multiple WiFi APs and LAA eNBs.

By way of a non-limiting example, a co-located LAA eNB might desire operation where a middling WiFi node has neighboring WiFi nodes with particular current channel conditions and/or usages. Access to such channel condition and/or usage information could reveal a beneficial opportunity to tailor the operation of the co-located middling AP and/or tailor the neighboring WiFi APs to accommodate the LAA entry, in one or more embodiments. In one or more embodiments, such multi-RAT SON functionality takes into consideration operating information of LAA/LTE-U neighbors, and helps solve or address "starving" or "trapped" WiFi AP scenarios, and similarly apply to LTE based counterpart scenarios. In one or more embodiments, such multi-RAT SON functionality addresses cross-RAT starved or trapped requests for service in starved or trapped situations.

Currently, a LAA/LTE-U device looks to gain a shared portion of WiFi band without considering WiFi band needs. Instead of merely adapting to accommodate a bandwidth usurper (e.g., the LAA/LTE-U device) by merely suffering the sharing situation, a current resident RAN potentially also in turn become an usurper of yet other bands. For example, upon or as a result of an LAA/LTE-U intrusion, a WiFi AP might first respond by attempting to suffer the sharing situation, in one or more embodiment. Instead of suffering, or later when the sharing is determined to be problematic or inadequate, the WiFi AP attempts to offload in whole or in part to Bluetooth (or other RAN) or to yet another band (where WiFi becomes the protocol of use), in one or more embodiment. Regarding the latter, another unlicensed secondary band might become available for shared use by LAA and WiFi. If LAA enters the primary band (WiFi) while a WiFi AP is co-located and currently supporting traffic flow, such WiFi AP may shift at least some of its traffic to the secondary band in which the WiFi protocol is still applied. Such "migration" of flows across multiple available bands could occur in a reactive manner or be negotiated up front (e.g., with all involved base stations or access points).

For example, in one or more embodiments, an WiFi AP negotiates with a base station resident of the secondary band and/or the LAA eNB before formulating its offload or suffering strategy. If an offload by the WiFi AP to a secondary band is determined to happen, it can take place before an LAA entrant, e.g., to make room for the LAA entrant. In one or more embodiments, such co-existence management is handled by a RAN's base station independently, jointly or under a scheduler/controller's direction. In one or more embodiments, such handling occurs responsive to, or in consideration of shared/gathered information relating to all associated bands, band residents and/or usurpers. Coexistence behaviors that are initially set up, are dynamically updated upon migration events for instance, in one or more embodiments. Such Coexistence behaviors are dynamically updated as any of the shared/gathered information associated with each co-located access point from any of the associated RANs changes. As multiple unlicensed bands open up, such functionality would be applicable. For example, LAA might have to make decisions as to which one or more of such bands to pursue, in one or more embodiments. WiFi might or might not do the same, in one or more embodiments.

In one or more embodiments, to support deterministic and/or periodical transmissions of voice over internet protocol (VoIP) and video conferencing for instance, the present systems and methods involve enhancing or modifying the WLAN protocol for request to send (RTS), clear to send (CTS) and/or clear to send to nowhere (CTS2NW) for instance, to indicate the transmission period, transmission size per period, number of transmission bursts, time offset for the first transmission burst, etc. A WLAN device, in one or more embodiments, stacks or transmits such RTS/CTS/CTS2NW frames periodically to renew a transmission opportunity period (TXOP) for continuous transmissions. A CTS or CTS2NW message from a device, in one or more embodiments, is used to quiet or suppress the channel for a duration of time before the device begins to transmit. To ensure that the CTS or CTS2NW message does not collide with other communications in the band, the device determines if the medium is quiet before sending the message to reserve the medium for operation by the device, in one or more embodiments. For example, the device performs CCA and/or sends a RTS message to determine if the medium is quiet in one or more embodiments. In one or more embodiments, such CTS, CTS2NW and/or RTS messages is modified to include the aforementioned information. This applies to any CTS based message, such as CTS2SELF, CTS2N or CTS2SOMEWHERE.

Figure 2E:
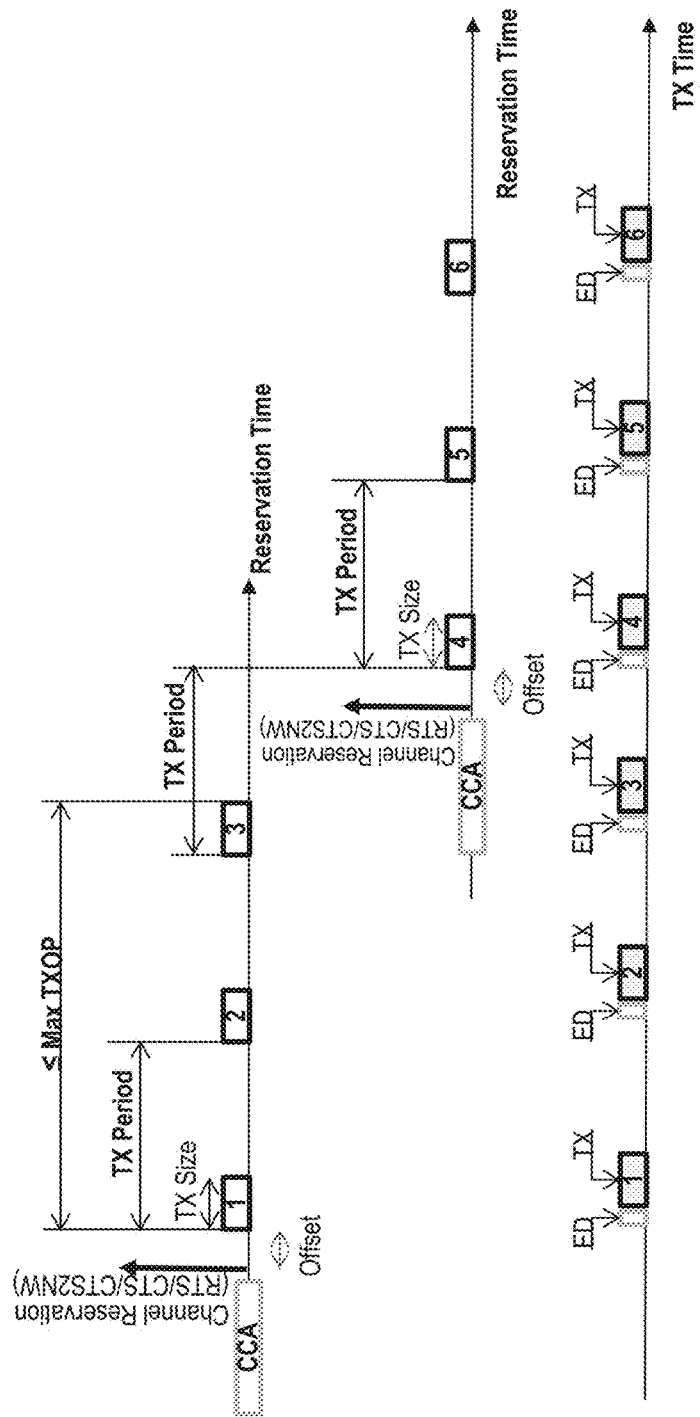
FIG. 2E depicts one embodiment of a method for supporting deterministic and/or periodical transmissions.

For instance, FIG. 2E depicts one embodiment of a method for supporting deterministic and/or periodical transmissions. In one or more embodiments, a transmitting device performs a clear channel assessment (CCA) of the channel, and upon successful completion of the CCA, includes information such as transmission period, transmission size per period, number of transmission bursts, time offset for the first transmission burst, etc., into one or more signals (e.g., RTS, CTS, CTS2NW) for preparing a data transmission. In one or more embodiments, the included information provides notice to other devices (of the same RAT or different RAT) of the upcoming data transmission and its channel usage. In one or more embodiments, other devices avoid channel access (and contention or collision) during one or more period of time based on the included information. In one or more embodiments, the included information is used to reserve the channel for the upcoming transmission, e.g., from use or intrusion by the other devices. By renewing a transmission opportunity period periodically or otherwise consistent with the included information, the transmitting device is able to occupy the channel for an extended period for deterministic and/or periodical transmissions of VoIP and video conferencing for instance. For instance, a second device is informed based on the included information that the number of transmissions or transmission bursts is 3, and has the option to attempt CCA and channel access after the first device's third transmission, in one or more embodiments. This is in contrast to merely performing ED prior to each transmission attempt for example, which does not adequately support deterministic and/or periodical transmissions in one or more embodiments.

In one or more embodiments, and by way of illustration, to introduce a LTE-U or non-WLAN device into a WLAN or unlicensed frequency band, the device sends a WLAN or 802.11 message to quiet the WLAN medium for a duration of time before the device begins to transmit in a non-WLAN mode. In one or more embodiments, before actually sending this WLAN/802.11 message, the device uses a mechanism, such as energy detection or RTS-CTS, to check whether the time is appropriate to send the message. This check avoids collision with other WLAN messages in one or more embodiments. When WLAN devices in the area successfully detect the message and refrain from operation for a duration of time specified in the message, in one or more embodiments. This allows the non-WLAN device to operate in the WLAN frequency band without interference from the WLAN devices for the specified duration of time in one or more embodiments.

Conventional LAA/LTE-U operation on the WiFi or unlicensed band involves transmit decisions that have no time relationship with transmit and reception decisions in WLAN. In one or more embodiments, attempting to receive a WLAN transmission during a period of ongoing LAA transmission is problematic. In one or more embodiments, a scheduler or designated entity coordinates all co-located WiFi and LAA/LTE-U transmissions to occur in a same direction at a same time. For example, and in one or more embodiments, through scheduling, common clocking, and/or low latency interfacing, an LAA/LTE-U eNB coordinates its downlink transmissions with a co-located WiFi AP's downlink transmissions, e.g., performing simultaneous or concurrent transmission. Simultaneous transmission involves full to partial overlap (e.g., in time), in one or more embodiments. In one or more embodiments, the scheduler or designated entity determines desired overlap situations wherein possibly differing time duration transmissions occur, and wherein the overlap positioning (scheduling) attempts to align transmission end-points to support simultaneous acknowledgment/negative acknowledgment (ack/nak) receipts). For instance, transmission overlap coordination, depending on the embodiment, might be performed based on a more detailed mapping of packet lengths, control overlap, and possibly even frame overlay adjustments. In one or more embodiments, such coordination is carried out by a WLAN as well as LAA enabled user device (e.g., UE) in uplink.

FIG. 2A depicts one embodiment of a system for co-existence management, involving at the use of a low latency interface. By way of a non-limiting example, one or more embodiments of the system includes a low-latency interface between co-located WLAN AP(s) and eNB(s) (e.g., small cell nodes) to exchange transmission indications, for example, transmission start time, transmission duration, channel numbers (e.g., primary/secondary channel numbers for WLAN), in one or more embodiments. FIG. 2B depicts one embodiment of a system for co-existence management, involving the use and/or exchange of transmission indications. In one or more embodiments, an access point sends a transmission indication after successful completion of clear channel assessment. However, before transmission or completion of a transmission exchange (e.g., RTS+CTS+ Data+ACK, or Data+ACK), an eNB sends a transmission indication, e.g., before transmission of downlink (DL) data or grant for uplink (UL) data. In one or more embodiments, the transmission indications are sent or exchanged using the low-latency interface. The scheduler(s) of the access point and eNB then attempts to avoid transmission overlaps across RANs in time and frequency (and in some embodiments, power as a further dimension), for example using the transmission indications. FIG. 2C depicts one embodiment of co-existence management for avoiding overlaps across channels.

In one or more embodiments, the interface between co-located access points of different RATs does not have to support low latency exchanges or operation, and can instead use a common clock synchronization. For example, in one or more embodiments, with clock synchronization, high latency advanced exchanges or coordination are supported via a centrally located scheduler or other scheduler architecture disclosed herein. In one or more embodiments, and such cross-RAT coordination could be applied between two LAA/LTE-U operators (e.g., between two different eNBs) with or without coordination with an WLAN AP, or any combination of the above.

Figure 2F:
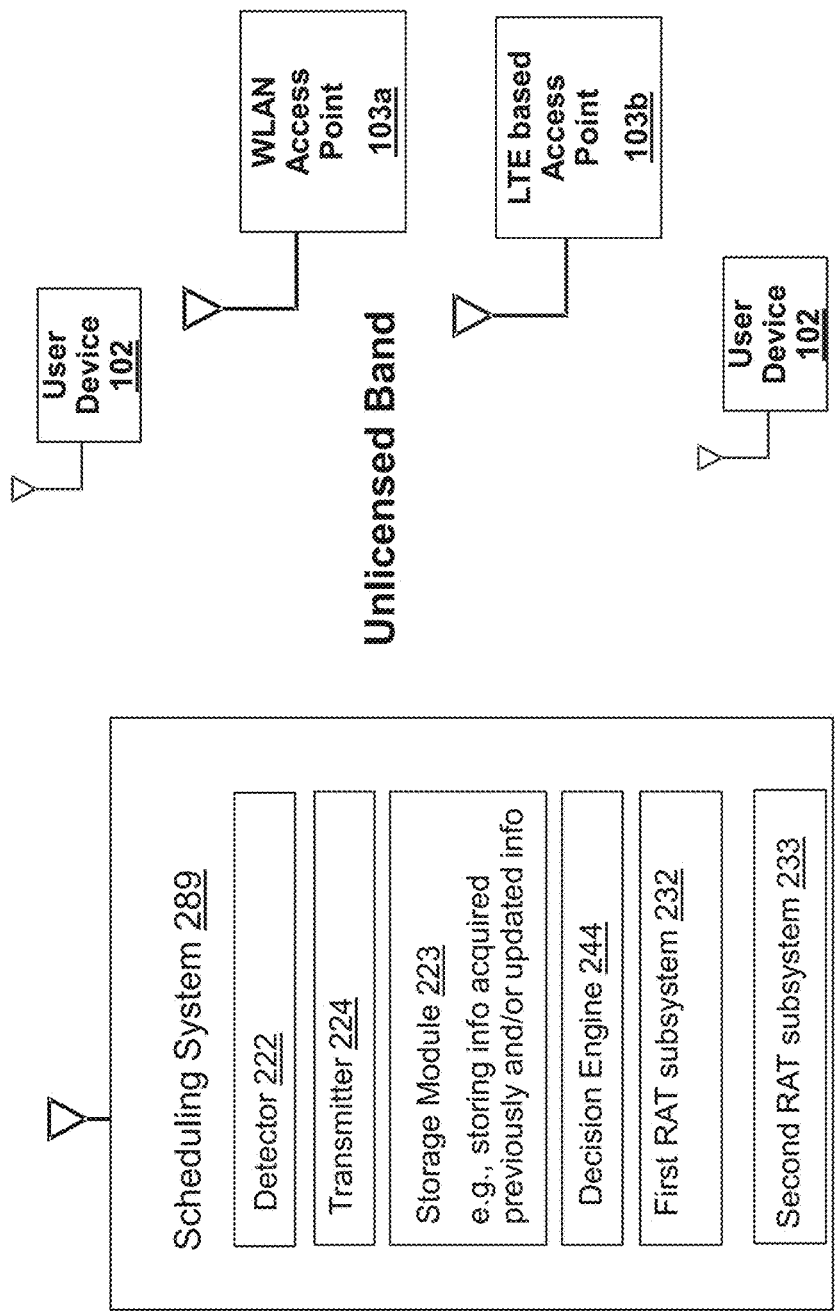
FIG. 2F depicts an embodiment of a system for coexistence management.

Referring to FIG. 2F one or more embodiments of a system for managing coexistence is depicted. In brief overview, the system includes, in one or more embodiments, a scheduling system 289 for managing or coordinating one or more devices 102, 103 operating within an unlicensed band (e.g., a WLAN frequency band or medium). The scheduling system 289 is sometimes referred to as a scheduler 289, with features and functionality described above. The scheduler 289 includes one or more of: a detector 222, a transmitter 224, a storage module 223, and one or more subsystems 232, 233, in one or more embodiments. In one or more embodiments, the scheduler 289 resides on one or more of user devices 102 and/or one or more access points 103, of one or more RATs. As such, each user devices 102 or access points 103 could include some or all elements or components described above, such as a detector 222 and a transmitter 224. Each of these elements or components is implemented in hardware, or a combination of hardware and software, in one or more embodiments. For instance, each of these elements or components can include any application, program, library, script, task, service, process or any type and form of executable instructions executing on hardware of the device 103, in one or more embodiments. The hardware includes one or more of circuitry or a processor, for example, as described above in connection with at least 1B and 1C, in one or more embodiments.

Although certain portions of the disclosure refer to coexistence between LTE based and WLAN communications and devices, these references are merely for illustration and not intended to be limiting. For example, the coexistence can be between WLAN and non-WLAN devices, between devices using different communications protocols or RATs, and/or between devices using differing modulation techniques and/ or having differing capabilities.

In one or more embodiments, the device 103 includes a detector 222 designed, built and/or implemented to detect, receive and/or snoop on a signal transmitted using any one or more of a plurality of RATs. In one or more embodiments, the detector 222 is designed, built and/or implemented to detect, monitor, read, receive, sense, measure, decode at least a portion of the signal. For instance, the detector detects an energy level of a signal and/or extracts information from a field of the signal frame. In one or more embodiments, the detector 222 is designed, built and/or implemented to detect any type or form of signals or transmissions, such as data or payload transmissions, packets, frames, control signals, handshaking signals, uplink and/or downlink transmissions, etc., and could include sounding frames, feedback frames, sounding sequences, beacons, null data packet (NDP) frames, announcement frames, broadcast frames, control frames, CTS and/or RTS based transmissions, etc.

In one or more embodiments, the detector 222 is designed, built and/or implemented to read, parse and/or decode at least a portion of a received or intercepted frame, such as a preamble of a frame. In one or more embodiments, the preamble portion, or another portion being read or decoded, includes one or more predefined patterns or sequences of data or information, e.g., according to an associated communications protocol and/or RAT.

In one or more embodiments, the scheduler 289 includes a transmitter 224 implemented to transmit one or more messages in one or more specific communication protocols or RATs (e.g., a WLAN protocol and/or a LTE protocol). For example, the scheduler 289 transmits, via the transmitter 224, one or more instructions or requests to a RAT-specific device (e.g., an access point operating under a first RAT) to operate in a certain manner, such as to transmit at a scheduled time, in one or more embodiments. In one or more embodiments, the transmitter 224 transmits one or more instructions or requests to one or more devices of one or more RATs to manage cross-RAT co-existence in an unlicensed band for instance. In one or more embodiments, the transmitter 224 conveys information about a first RAT, to a second RAT for use in co-existence management, and/or to determine whether and/or when to initiate channel access. The transmitter 224 transmits using wireless and/or wired transmission(s). One or more of these transmissions (of instructions, requests and/or information) is based on, or uses information shared with or received by the scheduler 289. For instance, an access point 103 of a first RAT shares operating information about the first RAT with the scheduler 289, so that the scheduler is able to perform cross-RAT coordination or management, or determine appropriate operation in a second RAT.

In one or more embodiments, a device operating under a first RAT (e.g., access point 103 or user device 102) includes a transmitter 224 residing in a RAT-specific device. In one or more embodiments, the transmitter 224 is designed, built and/or implemented to transmit a communicate a frame or packet that includes information about a first RAT for instance. The information might correspond to information intended or not intended to be shared or accessed by another device (e.g., a snooping device, a device of another RAT, a scheduler 289). In one or more embodiments, the transmitter is designed and/or implemented to include the information in a frame, packet or transmission.

In one or more embodiments, the scheduler 289 includes a decision engine 244. In one or more embodiments, the decision engine 244 performs determinations or makes decisions for intra or cross RAT coordination of operations and/or co-existence management. In one or more embodiments, the decision engine 244 performs determinations or makes decisions for scheduling functions and/or actions, such as determining a time for initiating channel access or a transmission. In one or more embodiments, the decision engine 244 determinates the information to include in a transmission, e.g., to one or more access points of one or more RATs. In one or more embodiments, the decision engine 244 determinates if there is an imbalance or unfair share of channel usage, and/or an action responsive to the determination. In one or more embodiments, the decision engine 244 determinates what information to use, receive or acquire from RAT-specific or other devices, and/or when to access or use such information. In one or more embodiments, the decision engine 244 determinates an operational (e.g., co-existence) mode, configuration and/or settings (e.g., transmission parameters) for one or more RATS and/or corresponding device(s). In one or more embodiments, the determination is according to, or based on information received or shared, e.g., about one or more RATs and/or corresponding device(s).

In one or more embodiments, the scheduler 289 and/or the decision engine 244 is implemented at least in part to accommodate co-existence or RAT-specific operation. For instance, the scheduler 289 instructs a LTE-U base station to leave some time in a LTE-U schedule unallocated in one or more embodiments. The scheduler 289 instructs the LTE-U base station to implement at least one time period that provides a free or idle medium for WLAN (or non-LTE based) operation, for example. The scheduler 289 instructs one or more WLAN devices 102 to obey listen-before-talk (LBT) protocol and ED deferral during normal, scheduled times for LTE-U operation, in one or more embodiments. One or more WLAN devices 102 is able to operate during an LTE-U unscheduled time period, in one or more embodiments.

The scheduler 289 includes a storage module 223 in one or more embodiments. The storage module 223 is implemented, designed and/or built to maintain, hold or otherwise store any type or form of information such as information received or shared, including previously obtained information and/or updated information. The storage module 223 includes any embodiment of elements and/or features of storage 128, main memory 122 and/or cache 140 described above in connection with at least FIGS. 1B and 1C, in one or more embodiments.

In one or more embodiments, any of the components (e.g., detector 222 or transmitter 224) operates with one or more subsystems 232, 233 to access RAT or protocol specific features, such as RAT-specific decoding capabilities for decoding a RAT-specific packet that is received or intercepted by the detector 222. A transmitter 224 operates with one or more subsystems 232, 233 for RAT-specific definitions to generate a RAT-specific frame, in one or more embodiments. A decision engine 244 operates with one or more subsystems 232, 233 for RAT-specific definitions to process received or stored information that is RAT-specific.

Figure 2G:
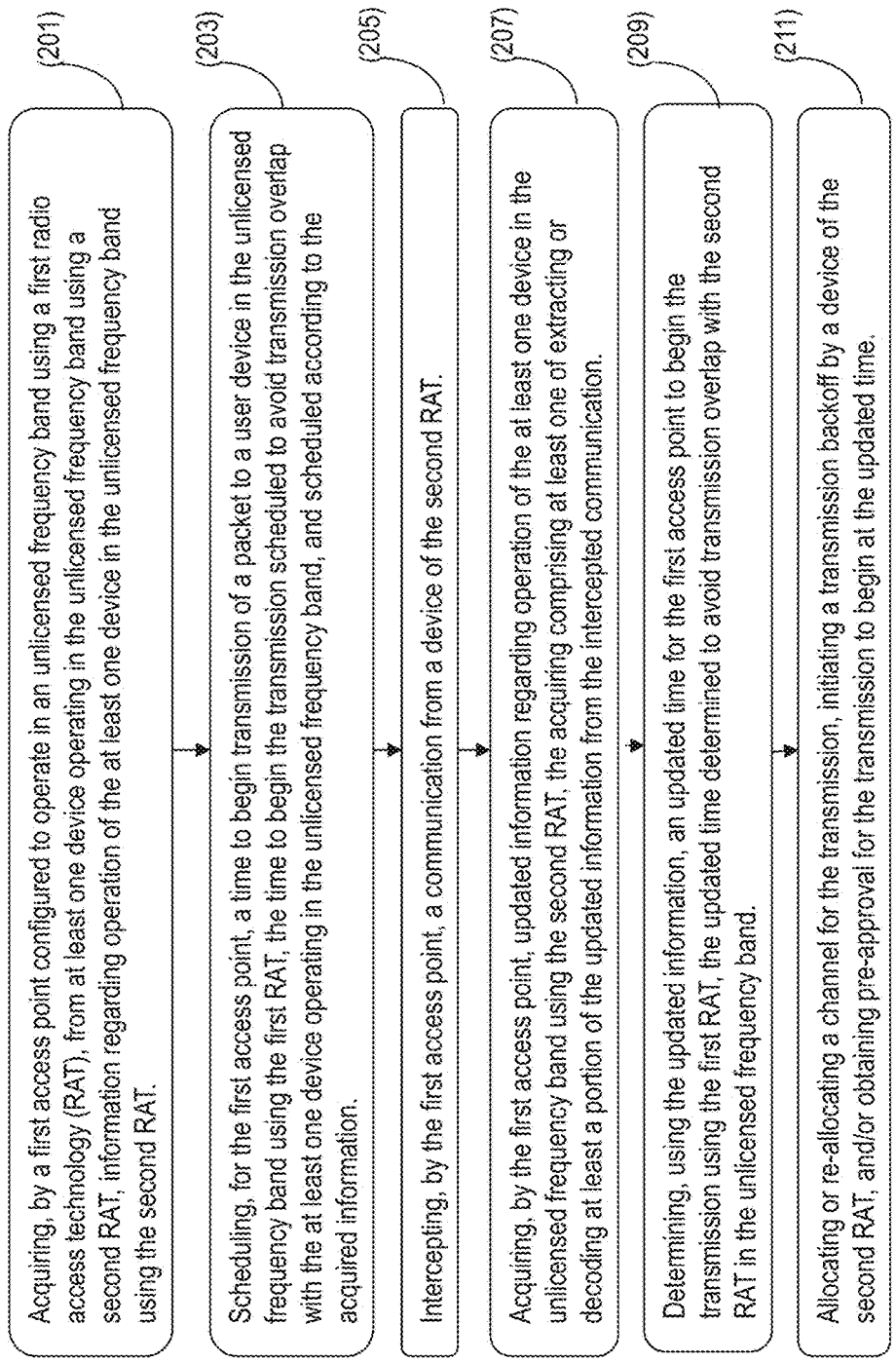
FIGS. 2G and 2H are flow diagrams depicting embodiments of methods for coexistence management.
Figure 2H:
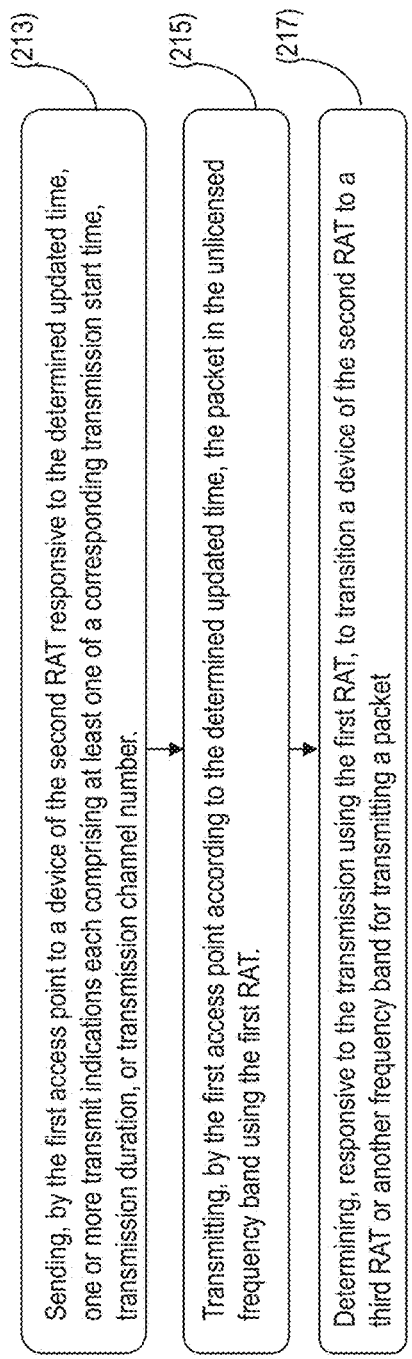

Referring now to FIGS. 2G and 2H, one or more embodiments of a method for coexistence management is depicted. In one or more embodiments, the method includes acquiring, by a first access point configured to operate in an unlicensed frequency band using a first RAT, from at least one device operating in the unlicensed frequency band using a second RAT, information regarding operation of the at least one device in the unlicensed frequency band using the second RAT (operation 201). A time is scheduled, for the first access point, to begin transmission of a packet to a user device in the unlicensed frequency band using the first RAT, the time to begin the transmission scheduled to avoid transmission overlap with the at least one device operating in the unlicensed frequency band, and scheduled according to the acquired information (operation 203). The first access point intercepts a communication from a device of the second RAT (operation 205). The first access point acquires updated information regarding operation of the at least one device in the unlicensed frequency band using the second RAT, the acquiring comprising at least one of extracting or decoding at least a portion of the updated information from the intercepted communication (operation 207).

An updated time is determined, using the updated information, for the first access point to begin the transmission using the first RAT, the updated time determined to avoid transmission overlap with the second RAT in the unlicensed frequency band (operation 209). Allocating or re-allocating a channel for the transmission, initiating a transmission back off by a device of the second RAT, and/or obtaining pre-approval for the transmission to begin at the updated time (operation 211). The first access point sends to a device of the second RAT responsive to the determined updated time, one or more transmit indications each comprising at least one of a corresponding transmission start time, transmission duration, or transmission channel number (operation 213). The first access point transmits, according to the determined updated time, the packet in the unlicensed frequency band using the first RAT (operation 215). A device of the second RAT determines, responsive to the transmission using the first RAT, to transition to a third RAT or another frequency band for transmitting a packet (operation 217).

Referring now to operation 201, and in one or more embodiments, a first access point, operating in an unlicensed frequency band using a first RAT, acquires from at least one device operating in the unlicensed frequency band using a second RAT, information regarding operation of the at least one device in the unlicensed frequency band using the second RAT. In one or more embodiments, the first RAT is a RAT different from the second RAT. For instance, and in one or more embodiments, the first RAT corresponds to one a WLAN RAT and the second RAT corresponds to a LTE based RAT.

In one or more embodiments, the first access point acquires the information from an access point and/or user device operating in the unlicensed frequency band using the second RAT, such as an eNB and/or UE using a LTE based RAT. In one or more embodiments, the first access point acquires the information from one or more of: a coordinating device, a scheduler, a central controller, or another device operating in the first RAT. In one or more embodiments, the first access point acquires any type or form of information described above. In one or more embodiments, the first access point receives, acquires, obtains, detects, measures, determines, extracts, accesses and/or decodes the information from the second RAT or a corresponding RAN. In one or more embodiments, the first access point receives or acquires the information from one or more packets, frames or transmissions of any type.

Referring now to operation 203, and in one or more embodiments, a time is scheduled, for the first access point, to begin transmission of a packet to a user device in the unlicensed frequency band using the first RAT. In one or more embodiments, the time to begin the transmission is scheduled to avoid transmission overlap with the at least one device operating in the unlicensed frequency band, and scheduled according to the acquired information. In one or more embodiments, a coordinating device, central controller or scheduler, of any of the disclosed embodiments, schedules the time to begin transmission. In one or more embodiments, the scheduling entity determines the time to begin transmission, based at least in part on the received or acquired information. In one or more embodiments, the scheduling entity determines the time to begin transmission, based at least in part on local (e.g., intra-RAT, first RAT) information.

Referring now to operation 205, and in one or more embodiments, the first access point intercepts, detects or receives a communication from a device of the second RAT. In one or more embodiments, the first access point monitors for one or more transmissions in the second RAT, for updated operating information about the second RAT. In one or more embodiments, the first access point intercepts the communication by performing ED or preamble detection in the unlicensed spectrum.

Referring now to operation 207, and in one or more embodiments, the first access point acquires updated information regarding operation of the at least one device in the unlicensed frequency band using the second RAT, the acquiring including at least one of extracting or decoding at least a portion of the updated information from the intercepted communication. In one or more embodiments, the first access point decodes and/or extracts one or more target or desired portions of the communication. In one or more embodiments, the first access point of the updated information decodes and/or extracts at least a portion of the information from the one or more target or desired portions of the communication. In one or more embodiments, the updated information includes new or addition information about the second RAT and/or about the operation of the at least one device in the unlicensed frequency band using the second RAT.

For example, and in one or more embodiments, the first access point obtains one or more transmit indications from the second RAT. In one or more embodiments, a device of the second RAT provides the one or more transmit indications each comprising at least one of a corresponding transmission start time, transmission duration, or transmission channel number, associated with the second RAT. In one or more embodiments, the device of the second RAT includes, injects or incorporates the one or more transmit indications into one or more frames (e.g., RTS and/or CTS based frames).

Referring now to operation 209, and in one or more embodiments, an updated time is determined, using the updated information, for the first access point to begin the transmission using the first RAT, the updated time determined to avoid transmission overlap with the second RAT in the unlicensed frequency band. In one or more embodiments, the updated time is determined by a scheduler. In one or more embodiments, the scheduler resides in the first access point. In one or more embodiments, the updated time is determined in one of: a central scheduler for the first and second RATs, a distributed scheduler system having at least one device operating in the first RAT and at least one device operating in the second RAT, or a user terminal operating in at least one of the first RAT and the second RAT.

In one or more embodiments, the scheduler and/or the first access point determines the updated time using the information from the second access point, the updated information, and information regarding operation using the first RAT in the unlicensed frequency band. In one or more embodiments, determining the updated time involves negotiating between the first access point using the first RAT, and at least one device using the second RAT in the unlicensed frequency band. In one or more embodiments, determining the updated time involves coordinating transmissions in the unlicensed frequency band between at least the first access point using the first RAT and at least one device using the second RAT.

Referring now to operation 211, and in one or more embodiments, the scheduler and/or the first access point determines to allocate or re-allocate a channel for the transmission, initiate a transmission back off by a device of the second RAT, and/or obtain pre-approval for the transmission to begin at the updated time. In one or more embodiments, the scheduler and/or the first access point coordinates operations between the first and second RAT to enable or accommodate transmission at the updated time.

In one or more embodiments, one or more devices of the first RAT and the second RAT establishes a SON. In one or more embodiments, the SON is established between at least the first access point and one or more devices operating in the unlicensed frequency band using the second RAT. In one or more embodiments, the SON implements a network adjustment to accommodate the transmission by the first access point at the updated time.

Referring now to operation 213, and in one or more embodiments, the first access point sends to a device of the second RAT responsive to the determined updated time, one or more transmit indications each comprising at least one of a corresponding transmission start time, transmission duration, or transmission channel number, associated with the first RAT. In one or more embodiments, the second access point uses the one or more transmit indications to avoid transmission overlap with the first access point in at least time and frequency.

Referring now to operation 215, and in one or more embodiments, the first access point transmits, according to the determined updated time, the packet in the unlicensed frequency band using the first RAT. Based on the updated time, the first access point performs CCA prior to the updated time in one or more embodiments. Based on the updated time, the first access point foregoes CCA in one or more embodiments. Based on the updated time, the first access point sends RTS and/or CTS based messages prior to the updated time, or foregoes such messages in one or more embodiments.

Referring now to operation 217, and in one or more embodiments, a device of the second RAT determines, responsive to the transmission using the first RAT, to transition to a third RAT or another frequency band for transmitting a packet. In one or more embodiments, the device of the second RAT avoids or is denied access to the unlicensed band during the transmission time of the first access point. In one or more embodiments, a coordinating device, central controller or a scheduler instructs the RAT to avoid the unlicensed band, or denies it access to the unlicensed band, during the transmission time of the first access point. Accordingly, the device of the second RAT determine if it could transition to a third RAT or another frequency band for transmitting a packet, in one or more embodiments. In one or more embodiments, a coordinating device, central controller or a scheduler instructs the RAT to transition to a third RAT or another frequency band for transmitting the packet.

Although examples of communications systems described above can include devices and access points operating according to an IEEE 802.11, 3GPP or LTE standard, it should be understood that embodiments of the systems and methods described can operate according to other standards and use wireless communications devices other than devices implemented as devices and base stations. For example, communication interfaces associated with cellular networks, satellite communications, vehicle communication networks, 802.11 and other non-802.11 wireless networks can utilize the systems and methods described herein to achieve improved overall capacity and/or link quality without departing from the scope of the systems and methods described herein.

It should be noted that certain passages of this disclosure can reference terms such as "first" and "second" in connection with devices, RATs, commnication protocols, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for managing co-existence, the method comprising:
   scheduling, for a first access point, a time to begin transmission of a packet to a user device in an unlicensed frequency band using a first radio access technology (RAT), the time to begin the transmission scheduled to avoid transmission overlap with a second access point using a second RAT in the unlicensed frequency band, and scheduled according to information from the second access point regarding operation in the unlicensed frequency band using the second RAT, wherein one of the first and second RATs comprises one of a wireless local area network (WLAN) RAT or a long term evolution (LTE) based RAT, and another of the first and second RATs comprises a remaining one of the WLAN RAT or the LTE based RAT;
   receiving, by the first access point, updated information extracted from at least one field in a preamble portion of a message transmitted by the second access point using the second RAT, regarding operation in the unlicensed frequency band using the second RAT, without the second access point being aware that the first access point is receiving the updated information;
   determining, using the updated information, an updated time for the first access point to begin the transmission using the first RAT, the updated time determined to avoid transmission overlap with the second RAT in the unlicensed frequency band; and
   transmitting, by the first access point according to the determined updated time, the packet in the unlicensed frequency band using the first RAT.

2. The method of claim 1, wherein determining the updated time comprises determining the updated time in one of: a central scheduler for the first and second RATs, a distributed scheduler system comprising at least one device operating in the first RAT and at least one device operating in the second RAT, or a user terminal operating in at least one of the first RAT and the second RAT.

3. The method of claim 1, wherein determining the updated time comprises determining the updated time using the information from the second access point, the updated information, and information regarding operation using the first RAT in the unlicensed frequency band.

4. The method of claim 1, wherein determining the updated time comprises negotiating between the first access point using the first RAT, and at least one device using the second RAT in the unlicensed frequency band.

5. The method of claim 1, wherein determining the updated time further comprises at least one of: allocating or re-allocating a channel for the transmission using the first RAT or a transmission using the second RAT, initiating a transmission back off by a device of the second RAT, or obtaining pre-approval for the transmission using the first RAT to begin at the updated time.

6. The method of claim 1, wherein receiving the updated information comprises intercepting, by the first access point, a communication in the second RAT, and at least one of extracting or decoding at least a portion of the updated information from the intercepted communication.

7. The method of claim 1, further comprising establishing a self-organizing network (SON) between at least the first access point and one or more devices operating in the unlicensed frequency band using the second RAT, the SON implementing a network adjustment to accommodate the transmission by the first access point at the updated time.

8. The method of claim 1, further comprising determining, responsive to the transmission using the first RAT, to transition a device of the second RAT to a third RAT or another frequency band for transmitting a packet, based at least on avoidance of or denial of access to the unlicensed frequency band.

9. The method of claim 1, further comprising sending, by the first access point to a device of the second RAT responsive to the determined updated time, one or more transmit indications each comprising at least one of a corresponding transmission start time, transmission duration, or transmission channel number.

10. The method of claim 1, wherein receiving, by the first access point, the updated information extracted from the at least one field in the preamble portion of the message transmitted by the second access point using the second RAT, regarding the operation in the unlicensed frequency band using the second RAT, comprises receiving, by the first access point, the updated information without the second access point being aware that the first access point is snooping or monitoring the updated information.

11. A system for managing co-existence, the system comprising:
   a first access point configured to operate in an unlicensed frequency band using a first radio access technology (RAT); and
   a scheduling engine configured to determine, for the first access point, a time to begin transmission of a packet to a user device in the unlicensed frequency band using the first RAT, the time to begin the transmission determined to avoid transmission overlap with a second access point using a second RAT in the unlicensed frequency band, and scheduled according to information from the second access point regarding operation in the unlicensed frequency band using the second RAT, wherein one of the first and second RATs comprises one of a wireless local area network (WLAN) RAT or a long term evolution (LTE) based RAT, and another of the first and second RATs comprises a remaining one of the WLAN RAT or the LTE based RAT;

wherein the first access point is further configured to receive updated information extracted from at least one field in a preamble portion of a message transmitted by the second access point using the second RAT, regarding operation in the unlicensed frequency band using the second RAT, without the second access point being aware that the first access point is receiving the updated information;

wherein the scheduling engine is further configured to determine, using the updated information, an updated time for the first access point to begin the transmission using the first RAT, the updated time determined to avoid transmission overlap with the second RAT in the unlicensed frequency band; and wherein the first access point is further configured to transmit, according to the determined updated time, the packet in the unlicensed frequency band using the first RAT.

12. The system of claim 11, wherein the scheduling engine comprises one of a central scheduler for the first and second RATs, a distributed scheduler system comprising at least one device operating in the first RAT and at least one device operating in the second RAT, or a user terminal operating in at least one of the first RAT and the second RAT.

13. The system of claim 11, wherein the scheduling engine is configured to determine the updated time using the information from the second access point, the updated information, and information regarding operation using the first RAT in the unlicensed frequency band.

14. The system of claim 11, wherein the scheduling engine is configured to at least one of allocate or re-allocate a channel for the transmission using the first RAT or a transmission using the second RAT, initiate a transmission back off by a device of the second RAT, or obtain pre-approval for the transmission using the first RAT to begin at the updated time.

15. The system of claim 11, wherein the first access point is configured to intercept a communication in the second RAT, and to at least one of extract or decode at least a portion of the updated information from the intercepted communication.

16. The system of claim 11, wherein the scheduling engine is configured to determine, responsive to the transmission using the first RAT, to transition a device of the second RAT to a third RAT or another frequency band for transmitting a packet, based at least on avoidance of or denial of access to the unlicensed frequency band.

17. The system of claim 11, wherein the first access point is configured to send to a device of the second RAT responsive to the determined updated time, one or more transmit indications each comprising at least one of a corresponding transmission start time, transmission duration, or transmission channel number.

18. The system of claim 11, wherein the first access point is configured to receive the updated information extracted from the at least one field in the preamble portion of the message transmitted by the second access point using the second RAT, regarding the operation in the unlicensed frequency band using the second RAT, without the second access point being aware that the first access point is snooping or monitoring the updated information.

19. A method for managing co-existence, the method comprising:

determining, for a first access point, a time to begin transmission of a packet in an unlicensed frequency band using a first radio access technology (RAT), the time to begin the transmission scheduled to avoid transmission overlap with a device using a second RAT in the unlicensed frequency band, and scheduled according to received information regarding operation in the unlicensed frequency band using the second RAT, wherein the first RAT comprises a wireless local area network (WLAN) RAT or a long term evolution (LTE) based RAT;

receiving, by the first access point, updated information extracted from at least one field in a preamble portion of a message transmitted by a second access point using the second RAT, regarding operation in the unlicensed frequency band using the second RAT, without the device being aware that the first access point is receiving the updated information;

determining, using the updated information, an updated time for the first access point to begin the transmission using the first RAT, the updated time determined to avoid transmission overlap with the second RAT in the unlicensed frequency band; and transmitting, by the first access point at the updated time, the packet in the unlicensed frequency band using the first RAT.

20. The method of claim 19, wherein receiving the updated information comprises intercepting, by the first access point, a communication in the second RAT, and at least one of snooping or monitoring at least a portion of the updated information from the intercepted communication.

\* \* \* \* \*